United States Patent [19]

Lorthioir et al.

[11] Patent Number: 5,294,423
[45] Date of Patent: Mar. 15, 1994

[54] PROCESS FOR THE PREPARATION OF AN ALKALI BOROHYDRIDE SUCH AS LITHIUM BOROHYDRIDE

[75] Inventors: Stéphane Lorthioir, Savigny-sur-Orge; Claude Humbert-Droz, Briis s/Forges; Serge Trennoy, Neuilly sur Marne, all of France

[73] Assignee: Commissariat a l'Energie Atomique, Paris, France

[21] Appl. No.: 873,462

[22] Filed: Apr. 24, 1992

[30] Foreign Application Priority Data

May 2, 1991 [FR] France .................... 91 05402

[51] Int. Cl.$^5$ ............................... C01B 6/17
[52] U.S. Cl. ......................... 423/286; 423/288
[58] Field of Search ............ 423/286, 288, 294, 295, 423/296

[56] References Cited

U.S. PATENT DOCUMENTS

| | | | |
|---|---|---|---|
| 2,741,540 | 4/1956 | Bragoon et al. | 423/287 |
| 3,379,511 | 4/1968 | Knorre et al. | 423/286 |
| 3,423,192 | 1/1969 | Snover | 423/287 |
| 3,795,491 | 3/1974 | Winiarczyk | 423/286 |
| 3,925,548 | 12/1975 | Oh | 514/259 |

FOREIGN PATENT DOCUMENTS 554372 12/1962 Canada ........................ 423/287
859468 1/1961 United Kingdom ........ 423/287

OTHER PUBLICATIONS

Chemical Abstracts, vol. 100, No. 24, Nov. 6, 1984, "Chemistry of Synthetic High Polymers" by Fred W. Billmeyer.
Chemical Abstracts, vol. 86, No. 14, Apr. 4, 1977, "Synthetic High Polymers" by Fred W. Billmeyer.
Journal of the American Chemical Society, vol. 75, No. 1, May 1, 1953, pp. 205–209.

Primary Examiner—Michael Lewis
Assistant Examiner—Stephen G. Kalinchak
Attorney, Agent, or Firm—Hayes, Soloway, Hennessey, Grossman & Hage

[57] ABSTRACT

The invention relates to a process for the preparation of an alkali metal borohydride.

According to this process, a mixture of an alkali metal hydride, boric anhydride and a hydrogenation catalyst such as Raney nickel is raised to a temperature of 250° to 300° C. under a hydrogen atmosphere. This gives an alkali metal borohydride, such as lithium-n borohydride, in accordance with the following reaction:

$$4LiH + B_2O_3 \rightarrow LiBH_4 + Li_3BO_3,$$

with a yield which can reach 93.3% at a temperature of 300° C.

11 Claims, No Drawings

PROCESS FOR THE PREPARATION OF AN ALKALI BOROHYDRIDE SUCH AS LITHIUM BOROHYDRIDE

The present invention relates to a process for the preparation of alkali metal borohydride, in particular lithium borohydride.

Alkali metal borohydride are interesting products, particularly as intermediates for the preparation of diborane, which is a fundamental compound in the chemistry of boranes, which can in particular be used as high energy constituents of special fuels and as reagents in modern organic synthesis.

A known process for the preparation of sodium borohydrides uses as the starting product the corresponding alkali metal hydride, as described by Schlesinger et al in J. Am. Chem. Soc., 1953, vol. 75, pp 205 to 209. This process consists of reacting sodium hydride with methyl borate or boric oxide. In the case of boric oxide, where the reaction diagram is as follows:

$$4NaH + 2B_2O_3 \rightarrow 3NaBO_2 + NaBH_4$$

the reaction is performed at 330° to 350° C. for 20 to 48 hours. Thus, as is stated on p 208 of the document, it is necessary to operate at a temperature above 300° C. to obtain an acceptable sodium borohydride yield.

For the preparation of lithium borohydride, the standard practice is to start with sodium borohydride and react the latter with a lithium halde such as LiBr or LiCl in an appropriate organic solvent, as is described in Inorg. Chem., 1981, 20, pp 4454–4456 and Inorg. Chem., 1982, 21, p 3657.

Thus, the known processes for the preparation of sodium borohydride and lithium borohydride call on different reaction mechanisms.

The present invention relates to a process for the preparation of an alkali metal borohydride and in particular lithium borohydride, based on the reaction of an alkali metal hydride with boric anhydride, which leads to higher yields than those obtained in the case of the known process for the preparation of NABH4, where the yield is only 51%.

According to the invention, the process for the preparation of an alkali metal borohydride by the reaction of alkali metal hydride with boric anhydride is characterized in that the reaction takes place in the presence of hydrogen and a hydrogenation catalyst.

As a result of using a hydrogen atmosphere, e.g. a partial hydrogen pressure of 0.1 to 1 MPa, and a hydrogenation catalyst, it is possible to carry out the reaction according to the following reaction diagram:

$$4 MH + B_2O_3 \rightarrow MBH_4 + M_3BO_3$$

in which M is the alkali metal, which is very different from the reaction diagrams described by Schlesinger et al in the aforementioned document and can be carried out with a high borohydride yield at lower temperatures than those used by Schlesinger et al.

The catalysts used in the process according to the invention are conventional hydrogenation catalysts, preferably in the form of a finely divided powder.

Examples of such catalysts are Raney nickel, platinum, palladium and lanthanum zeolites.

For the performance of the process according to the invention, preferably the following stages are performed:

a) mixing a powder of the alkali metal hydride with boric anhydride powder and a powder of the hydrogenation catalyst,
b) introducing the mixture of powders into an oven,
c) heating the mixture in the oven to a temperature of 250° to 350° C., under a hydrogen atmosphere and for 12 to 72 h, and
d) separating the alkali metal borohydride produced.

In the first stage, the alkali metal hydride powder is mixed with boric anhydride powder and the catalyst, preferably using boric anhydride and hydride quantities such that they substantially correspond to 4 mole of alkali metal hydride per mole of boric anhydride and by aiding approximately 5 to 10% by weight of hydrogenation catalyst. Mixing can take place in a polypropylene bottle containing a certain quantity of aluminium balls to obtain a homogeneous mixture.

After preparing the mixture,, it is introduced into an oven, e.g. an Armco iron crucible. It is possible to use different types of ovens, kilns or furnaces and in particular static or rotary ovens. When use is made of a static oven, it is necessary to operate under a high hydrogen pressure, e.g. 0.1 to 1 MPa, to obtain a satisfactory yield. However, it is possible to operate with a static oven under a low hydrogen pressure, e.g. approximately 0.1 MPa, provided that the mixture is stirred in the oven.

In the case where a rotary oven is used, it is possible to use a low partial hydrogen pressure, e.g. approximately 0.1 MPa. The mixture is raised to the desired temperature in the oven for a time which can vary between 12 and 72 h. The t&% is in particular chosen as a function of the hydrogenation pressure and temperature used, so that a high yield results.

Following the reaction, the alkali metal borohydride produced is separated by selectively extracting it from the product of the reaction in an appropriate solvent, e.g. ethyl ether, tetrahydrofuran or isopropyl anine.

This can be carried out by placing the reaction product present in the crucible which has been removed from the oven in a round-bottom three-neck flask under a neutral atmosphere, e.g. having a residual moisture content below 40 ppm, followed by the addition of ethyl ether previously dried by aluminium-lithium hydride, so as to selectively extract, under reflux and stirring, the alkali metal borohydride. After dissolving the borohydride in ethyl ether, the solution is filtered so as to extract from it the solid particles. It is then possible to recover the borohydride by direct evaporation of the ethyl ether. This is generally followed by a heat treatment at 50° to 200° C. and under a pressure of approximately 0.135 Pa to purify the alkali metal borohydride.

The following non-limitative examples illustrate the performance of the process according to the invention for the preparation of lithium borohydride from lithium hydride.

EXAMPLE 1

In this example, lithium hydride powder having an average grain size of 50 μm is mixed wth boric oxide powder having an average grain size of 90 μm so as to have a LiH BO molar ratio of 4 and to the mixture is added 10% by weight of Raney nickel. The mixture is then introduced into the/crucible of a fixed oven and it is kept in the latter under a hydrogen pressure of 0.7 MPa, at a temperature of 350° C. for 72 hours.

The lithium borohydride produced in the oven is then extracted and the products of the reaction are placed in a round-bottom three-neck flask and ethyl ether is added to bring about dissolving under reflux and stirring. After dissolving, the solution is filtered and the lithium borohydride is recovered by direct ethyl ether evaporation. It is then desolvated by a heat treatment at 100° C. under a pressure of 0.135 Pa.

This is followed by the evaluation of the purity of the thus produced lithium borohydride measuring the active hydrogen given off during the hydrolysis of the in the acid medium in accordance with the following reaction:

$$LiBH_4 + 2H_2O \xrightarrow{H^+} LiBO_2 + 4H_2$$

The purity exceeds 99.5%. The lithium borohydride quantity produced corresponds to a yield of 59.3%, based on the starting lithium hydride.

COMPARATIVE EXAMPLE 1

The same operating procedure as in example 1 is used for preparing lithium borohydride, except that no catalyst is added to the reaction mixture.

Here again, the purity of the product once again exceeds 99.5%, but the yield is only 14%.

EXAMPLE 2

This example follows the sane operating procedure as in example 1, but the reaction is performed at a temperature of 300° C. for 72 hours.

Under these conditions, the yield is 85.6% and lithium borohydride is obtained having a purity level exceeding 99.5%, as in example 1.

On comparing the results of examples 1 and 2, it can be seen that a higher yield is obtained by operating at a temperature of only 300° C.

EXAMPLE 3

This example follows the sane operating procedure as in example 2, but the reaction is performed at 300° C. for 48 instead of 72 hours.

Under these conditions, the yield is 93.3% and lithium borohydride is obtained, which once again has a purity level exceeding 99.5%.

On comparing the results of examples 2 and 3, it can be seen that a higher yield is obtained by carrying out the reaction for 48 instead of 72 hours.

Thus, the process according to the invention is very interesting, because it makes it possible to obtain yields higher than those obtained with the known processes and using lower temperatures, particularly as a result of the use of a hydrogenation catalyst.

Although the above examples only relate to lithium, the process of the invention is also applicable in the same way to other alkali metals, e.g. sodium and potassium.

We claim:

1. A process for the preparation of an alkali metal borohydride which comprises catalytically hydrogenating boric anhydride with alkali metal hydride in the presence of hydrogen and a hydrogenation catalyst.

2. Process according to claim 1, characterized in that the catalyst is Raney nickel.

3. Process according to claim 1, characterized in that the reaction is performed under a partial hydrogen pressure of 0.1 to 1 MPa.

4. Process according to claim 1, characterized in that it comprises the following stages:
   a) mixing an alkali metal hydride powder with boric anhydride powder and a hydrogenation catalyst powder,
   b) introducing the powder mixture into an oven,
   c) heating the mixture in the oven to a temperature of 250° to 350° C., under a hydrogen atmosphere and for 12 to 72 h, and
   d) separating the alkali metal borohydride produced.

5. Process according to claim 4, characterized in that use is made of a static oven and a hydrogen pressure of 0.1 to MPa.

6. Process according to claim 4, characterized in that an agitated static oven and a hydrogen pressure of approximately 0.1 MPa are used.

7. Process according to claim 4, characterized in that use is made of a rotary oven and a hydrogen pressure of approximately 0.1 MPa.

8. Process according to claim 1, characterized in that the alkali metal borohydride is separated by selective extraction in ethyl ether.

9. Process according to claim 8, characterized in that the alkali metal borohydride then undergoes a thermal desolvation treatment at a temperature of 50° to 200° C. and under a pressure of approxknately 0.135 Pa.

10. Process according to claim 1, characterized in that the alkali metal is lithium.

11. Process according to claim 4 wherein the alkali metal is lithium.

* * * * *

UNITED STATES PATENT AND TRADEMARK OFFICE
CERTIFICATE OF CORRECTION

PATENT NO. : 5,294,423
DATED : March 15, 1994
INVENTOR(S) : Lorthioir et al

It is certified that error appears in the above-indentified patent and that said Letters Patent is hereby corrected as shown below:

Claim 9, Col. 4, line 45, "approxknately" should be --approximately--

Signed and Sealed this

Nineteenth Day of September, 1995

Attest:

BRUCE LEHMAN

Attesting Officer

Commissioner of Patents and Trademarks